April 4, 1961  R. H. PHILLIPS ET AL  2,978,092
ACCUMULATOR FOR CONVERGING CONVEYORS
Filed July 14, 1959  3 Sheets-Sheet 1
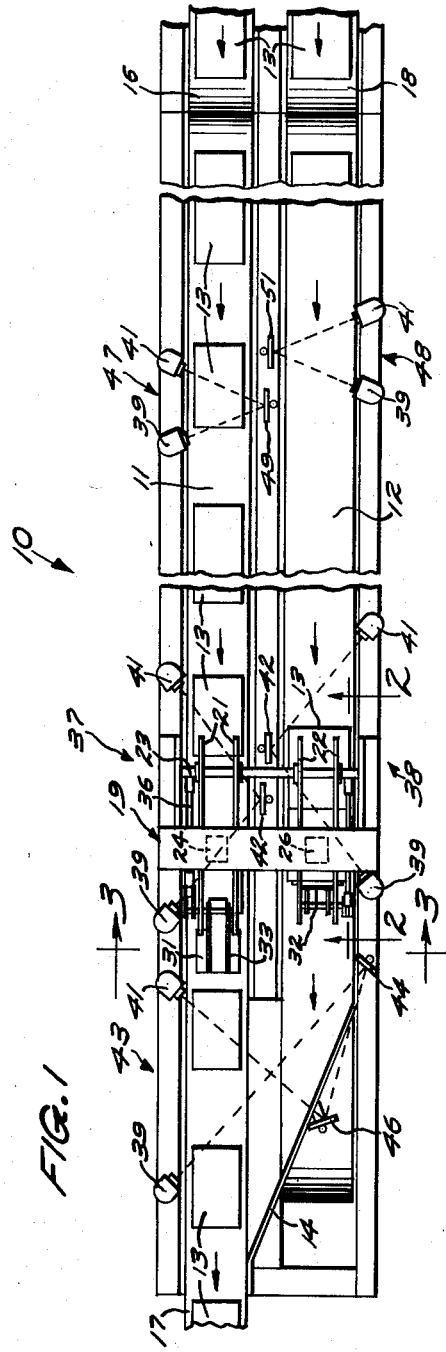
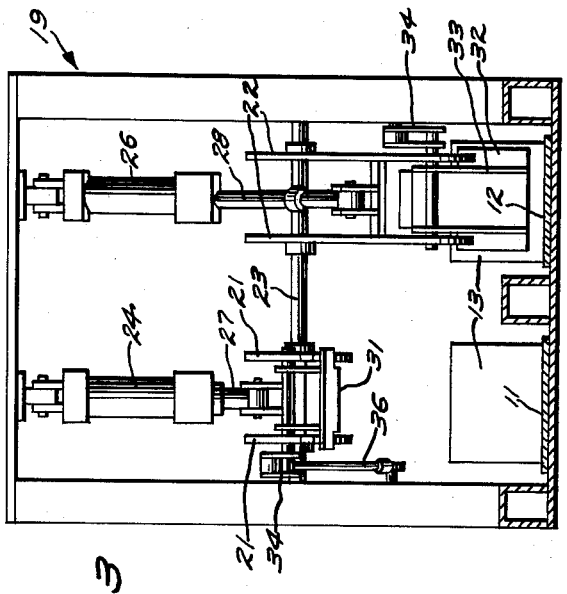
INVENTORS
R. H. PHILLIPS
J. E. SOLECKI
BY R. P. Miller
ATTORNEY

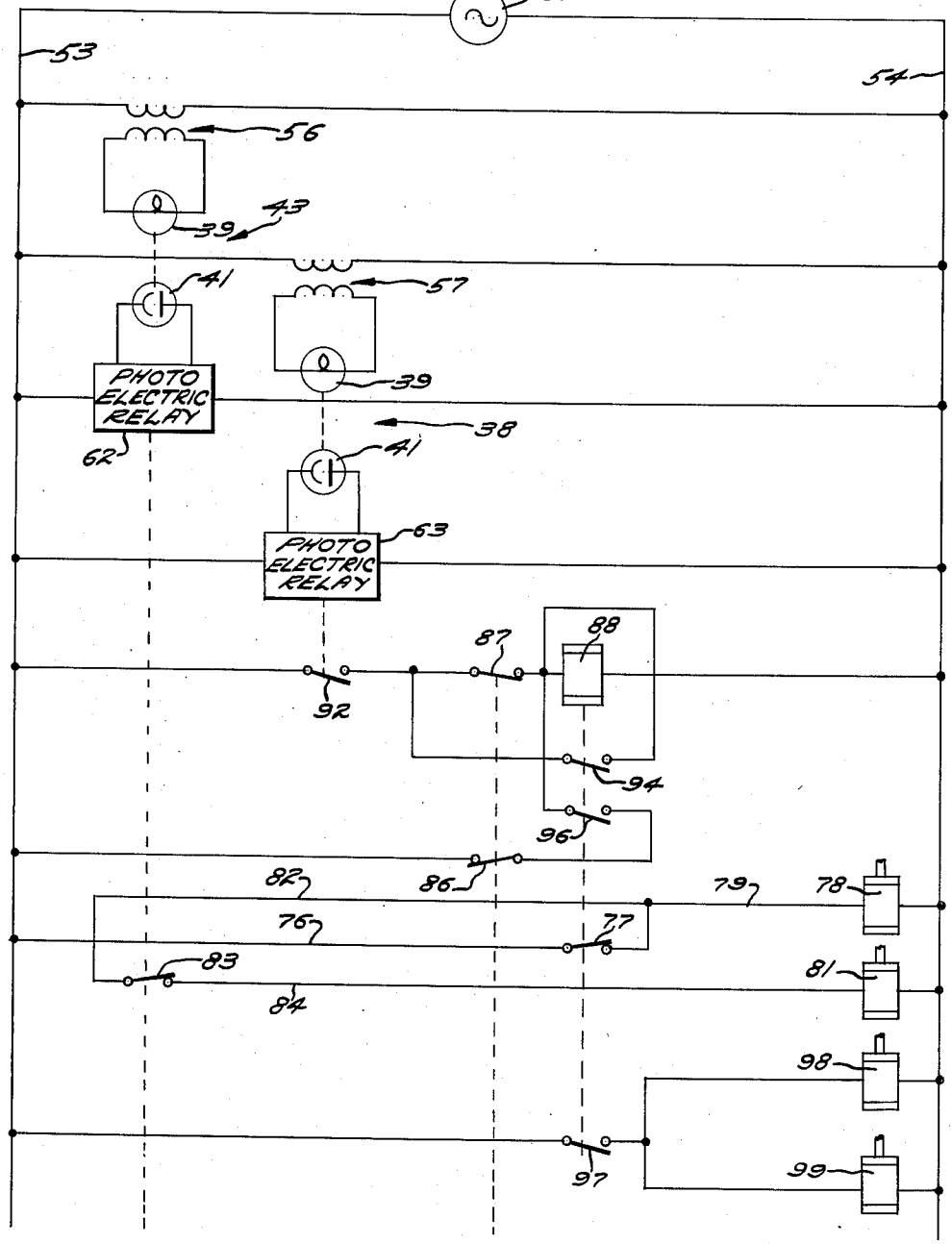

2,978,092

ACCUMULATOR FOR CONVERGING CONVEYORS

Richard H. Phillips and John E. Solecki, Indianapolis, Ind., assignors to Western Electric Company, Incorporated, New York, N.Y., a corporation of New York Filed July 14, 1959, Ser. No. 827,095

9 Claims. (Cl. 198—32)

This invention relates to an accumulator for converging conveyors or more particularly, to a system for selectively controlling the advancement of articles from a plurality of conveyors onto a single conveyor.

In conveyor systems wherein a plurality of conveyors converge into a single conveyor, apparatus must be used to control the movements of articles on the plurality of conveyors onto the single conveyor. Such an apparatus, or accumulator system, should control the advancement of articles in such a manner as to most efficiently advance the articles to the single conveyor and at the same time prevent undue delay and accumulation of articles on the various conveyors. An accumulator system should also have provisions for shutting down the entire or portions of the conveyor system upon large accumulations of articles or upon a jamming of the articles at the point of convergence of the conveyors.

It is therefore an object of this invention to provide a new and improved accumulator for converging conveyors.

It is another object of this invention to provide an accumulator for selectively controlling the advancement of articles from a plurality of conveyors which converge into a single conveyor.

It is another object of this invention to provide movable stop means before the point of convergence of a plurality of conveyors and to selectively control the stop means to advance the articles on the conveyors.

It is another object of this invention to provide a movable stop means with each of a plurality of converging conveyors which are selectively operable by a scanning system associated with each conveyor for selectively controlling the advancement of articles on the conveyors.

It is a further object of this invention to provide an accumulator having a plurality of conveyor sections forming continuations of a plurality of conveyors, said conveyor sections converging into a single conveyor and being provided with a plurality of scanning devices which (1) selectively control the positioning of a stop means associated with each conveyor, (2) effect the operation of the stop means on articles being positioned at the converging point of the conveyor sections and (3) shut down a conveyor upon an undue accumulation of articles on the conveyor section forming a continuation thereof.

With these and other objects in view, the present invention contemplates an accumulator for selectively controlling the advancement of articles from a pair of conveyors onto a third conveyor. The accumulator comprises a main conveyor section forming the initial portion of the third conveyor and a continuation of one of said pair of conveyors and a secondary conveyor section forming a continuation of the other of said pair of conveyors and converging into the main conveyor section. Stop means are provided for each conveyor section before the point of convergence thereof which are movable into and out of the path of articles moving on the associated conveyor sections. Photoelectric scanning means are provided to (1) sense articles approaching the stop means, (2) sense articles positioned at the junction of convergence of the conveyor sections and (3) sense a back up or accumulation of articles on the conveyor sections. A control system is provided to selectively operate the stop means under the influence of the photoelectric scanning means and to shut down either or both of the pair of conveyors upon a large accumulation of articles on the conveyor sections forming a continuation thereof and to shut down the entire conveyor system upon a jamming of articles at the point of convergence of the conveyor system.

Other objects, advantages and novel aspects of the invention will become apparent upon consideration of the following detailed description in conjunction with the accompanying drawings, wherein:

Fig. 1 is a top plan view disclosing an accumulator positioned between a pair of conveyors which feed articles into a single conveyor, embodying the principles of the present invention;

Fig. 2 is an enlarged view taken along line 2—2 of Fig. 1 disclosing the details of movably mounted stop means on the accumulator;

Fig. 3 is an enlarged sectional view taken along line 3—3 of Fig. 1 further disclosing the stop means shown in Fig. 2; and Figs. 4 and 5 disclose a circuit for controlling the accumulator shown in the other figures.

Figure 5:
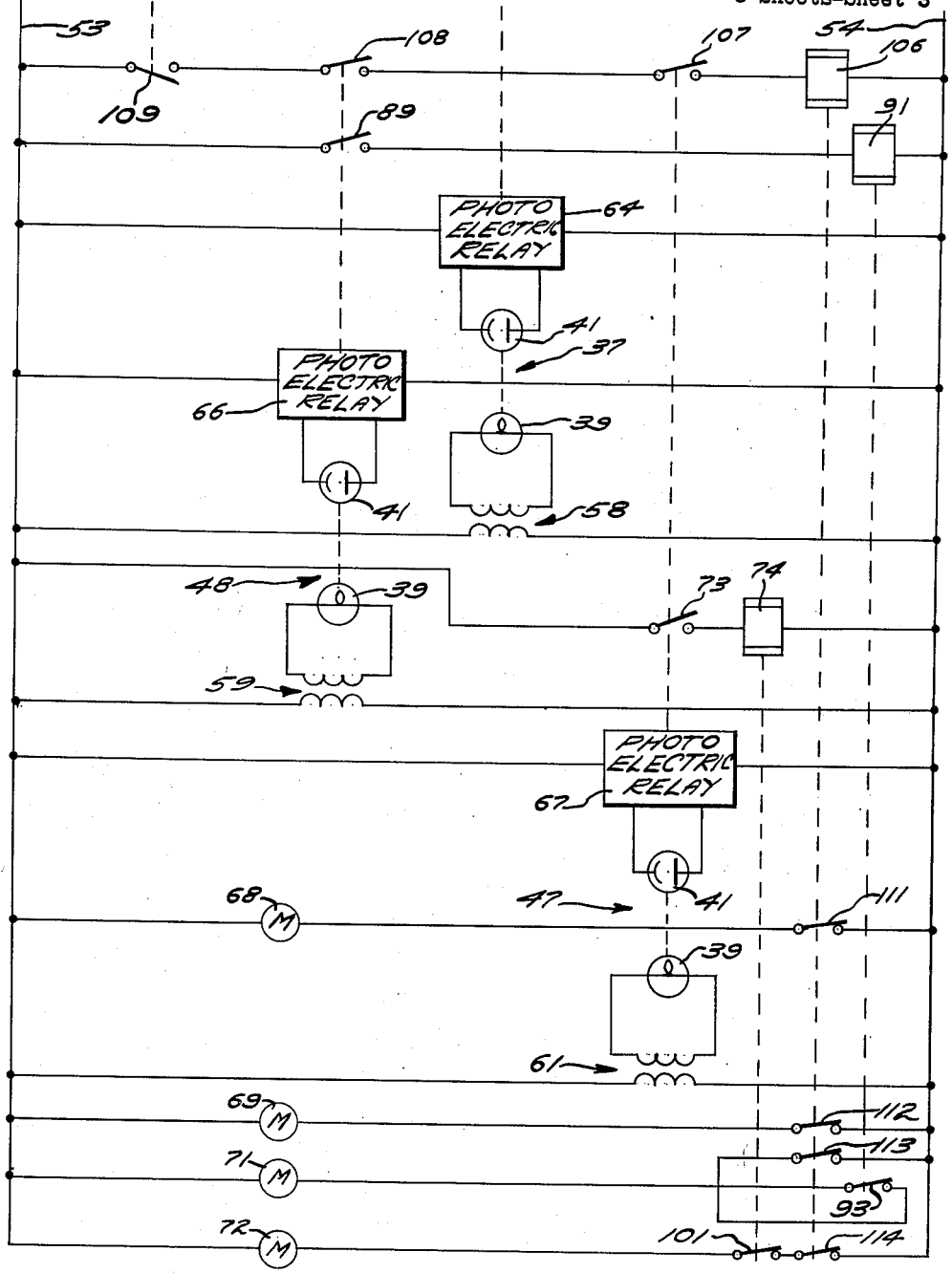

Referring now to Figs. 1 through 3 wherein is shown an accumulator generally designated by the numeral 10 which comprises a main conveyor section 11 and a secondary conveyor section 12. The secondary conveyor section 12 extends parallel to and adjacent the main conveyor section 11 and converges into the main section 11 by guiding articles 13 onto the section 11 by means of a guide rail 14. The main conveyor section 11 forms a continuation of a conveyor 16 and also forms the initial portion of a single conveyor 17. The secondary section 12 forms a continuation of a conveyor 18 which guides the articles 13 moving therealong onto the section 11 forming the initial portion of the conveyor 17. It may therefore be understood that the accumulator serves as a control system for converging a pair of conveyors 16 and 18 into a single conveyor 17. The drawings and specification disclose and discuss an accumulator for converging only a pair of conveyors into a single conveyor, but it is to be understood that many other conveyors, as the conveyors 16 and 18, may be converged by the principles of the instant invention into a single conveyor 17.

A frame structure generally designated by the numeral 19 is placed across the conveyor sections 11 and 12 before the convergence point thereof and supports two pairs of arms 21 and 22 rotatably on a shaft 23. The arms 21 and 22 are positioned over the conveyor sections 11 and 12, respectively, and the free ends thereof are movable toward and away from the associated conveyor sections under the action of air cylinders 24 and 26. The air cylinders 24 and 26 are pivotally mounted to the top of the frame 19 and have piston rods 27 and 28 pivotally connected to each pair of arms 21 and 22, respectively.

The pairs of arms are provided with stop plates 31 and 32 pivotally mounted to the free ends of the arms 21 and 22 respectively, by means of mounting flanges 33. The mounting flanges are provided with links 34 secured thereto which are connected to the frame 19 by means of rods 36. The rods 36 pivot the stop plates 31 and 32 from a position perpendicular to the associated conveyor section, wherein the stop plates are placed in the path of movement of articles on the associated conveyor sections, to a position substantially parallel to the conveyor sections, wherein the articles may freely move thereunder. The stop plates are moved between perpendicular and parallel positions upon movement of the arms 21 and 22 toward and away from the conveyor sections under the influence of the air cylinders 24 and 26.

The accumulator 10 is provided with a first pair of scanning systems 37 and 38 each comprising a light source 39 and a photoelectric tube 41. The scanning systems 37 and 38 are set up to direct a beam of light from the light sources 39 to mirrors 42 across the respective conveyor sections and back to the photoelectric tubes 41. The light beams of the scanning systems 37 and 38 are positioned such that an article 13 passing beneath the frame 19 on the main conveyor section 11 will break the light beam of the scanning system 37 and an article 13 passing beneath the frame 19 on the secondary conveyor section 12 breaks the light beam of the scanning system 38. Another scanning system 43, also made up of a light source 39 and a photocell 41 is positioned at the point of convergence of the two conveyor sections and directs a light beam from the light source 39 to mirrors 44 and 46 and back to a photoelectric tube 41. A second pair of scanning systems 47 and 48 reflect a light beam from light sources 39 to mirrors 49 through 51 and back to photoelectric tubes 41 across the conveyor sections 11 and 12, respectively, at a position intermediate the frame 19 and the conveyors 16 and 18 such that articles moving along the conveyor sections 11 and 12 break the light beams.

*Operation*

Referring now to Figs. 4 and 5, a source of electrical power 52 is placed across conductors 53 and 54 to illuminate the light sources or lamps 39 by means of transformers 56, 57, 58, 59 and 61 such that the light is reflected onto the photocells 41 of the scanning systems 43, 38, 37, 48 and 47, respectively. Power being placed on the conductors 53 and 54 and the light beams being reflected on the photocells 41 operate photoelectric relays 62, 63, 64, 66 and 67 connected to scanning systems 43, 38, 37, 48 and 47, respectively. The contacts for the photoelectric relays are shown in the positions occupied when the photoelectric relays are in an operated condition whereas the contacts of the standard type relays are shown in the positions occupied when the relays are in a non-operated condition. Power from the conductors 53 and 54 also energizes and operates a motor 68 for driving the main conveyor section 11, a motor 69 for driving the secondary conveyor section 12 and motors 71 and 72 for driving the conveyors 18 and 16, respectively.

The circuit as shown in Figs. 4 and 5 illustrates the operating conditions existing when no articles are moving along either the main conveyor section 11 or the secondary conveyor section 12. With the circuit set up in this manner, electrical power is directed from the conductor 53 through conductor 76 and contacts 77 to a solenoid 78 through a conductor 79 and to a solenoid 81 through a conductor 82, contacts 83 and a conductor 84 and back to the conductor 54 to operate solenoids 78 and 81. Solenoid 81 operates an air valve (not shown) for forcing air into one side of the cylinder 24 to force the piston rod 27 upwardly to retract or move the arms 21 upwardly thereby raising the stop plate 31 and pivoting the plate to a position parallel to the conveyor section 11. Solenoid 78 operates an air valve (not shown) to force air into the cylinder 26 to force the piston rod 28 down to advance or move the arms 22 downwardly to position the stop plate 32 in a position perpendicular to the path of articles on the conveyor section 12 to prevent articles from moving past the stop plate.

Assuming first that articles begin to move from the conveyor 16 and along the main conveyor section 11, the articles will interrupt the light beam of the scanning system 47 which will restore photoelectric relay 67 to close contacts 73. Closure of contacts 73 completes an energizing circuit for a time delay relay 74. The time delay relay 74 does not operate at this time, however, since the articles do not break the light beam of scanning system 47 for a sufficient length of time to allow the relay to operate. As the articles continue down the main conveyor section 11, the articles interrupt the light beam of the scanning system 37 to restore photoelectric relay 64 which opens contacts 86 and 87 to prevent the possibility of operating a control relay 88. The opening of contacts 86 and 87 to prevent the operation of relay 88 insures the retaining of solenoids 78 and 81 in their energized position and thereby prevents the arms 21 and 22 from being moved out of the position shown in Figs. 2 and 3. As long as a continuous flow of articles move along the main conveyor section 11 the light beam of the scanning system 37 will be continuously broken and the stop plates will remain in the position to allow articles on the section 11 to pass beneath the frame 19 and onto the single conveyor 17.

Assuming now that articles begin to move from conveyor 18 onto the secondary conveyor section 12 and the articles interrupt the light beam of scanning system 48 to restore photoelectric relay 66 which thereupon closes contacts 89. Closure of contacts 89 completes an energizing circuit for a time delay relay 91 which does not operate at this time since articles passing the scanning system 48 do not interrupt the light beam for a sufficient length of time to allow the time delay relay 91 to operate. The articules continue along the secondary conveyor section and interrupt the light beam of scanning system 38 which restores photoelectric relay 63. The restoration of the photoelectric relay 63 closes contacts 92 in the energizing circuit of control relay 88. Control relay 88 does not operate, however, as long as articles are passing scanning system 37 which restored photoelectric relay 64 and opened contacts 87. Under these conditions, therefore, the stop plate 32 will remain in the perpendicular position blocking the articles moving along the secondary conveyor section 12 whereby the articles are accumulated on the section 12. If the accumulated articles on the conveyor section 12 back up to that point which will interrupt the light beam of scanning system 48, photoelectric relay 66 will again restore to close contacts 89 for a sufficient length of time to operate the time delay relay 91. Operation of the time delay relay 91 opens contacts 93 which breaks the energizing circuit for the motor 71 to shut down the conveyor 18 to prevent a further accumulation of articles in the secondary conveyor section 12. The conveyor section 12 however continues to move with the articles accumulated thereon being blocked by the stop plate 32.

Upon a separation in the articles moving along the main conveyor section 11 of a sufficient length to allow a completion of the light beam to the photoelectric tube 41 of the scanning system 37, the photoelectric relay 64 will again operate to close contacts 86 and 87. Upon closure of contacts 87 an energizing circuit will be completed for the control relay 88 through the contacts 92 and 87 to operate the control relay. Operation of the control relay 88 closes the contacts 94, 96 and 97 and opens the contacts 77. Closure of contacts 94 completes an energizing circuit for the control relay 88 independent of the contacts 87 which may again be opened upon articles interrupting the light beam of scanning system 37 on the main conveyor section 11. Opening of the contacts 77 deenergizes the solenoids 78 and 81 which advanced the stop plate 32 and retracted the stop plate 31 respectively. Closure of contacts 97 completes an energizing circuit for solenoids 98 and 99. Operation of solenoid 98 operates an air valve (not shown) to force air into the cylinder 26 to move the piston rod 28 and thereby the arms 22 upwardly. The upward movement of the arms 22 causes the upward movement of the stop plate 32 and the pivoting thereof to a position parallel to the conveyor section 12. Operation of the solenoid 99 operates an air valve (not shown) to force air into the cylinder 24 to cause the piston rod 27 and thereby the arms 21 to move downwardly. Upon the downward movement of the arms 21, the stop plate 31 is also moved downwardly and pivoted to a position perpendicular to the main conveyor section 11 to prevent the movement of articles on the conveyor section 11 past the stop plate 31.

Upon the raising and pivoting to a parallel position of the stop plate 32, the articles accumulated on the secondary conveyor section 12 will be allowed to move past the stop plate 32 and onto the single conveyor 17 for as long as the light beam of a scanning system 38 remains interrupted by articles moving on the conveyor section 12. As the accumulated articles move onto the conveyor 17 the light source of the scanning system 48 will again be directed to the photocell 41 to again operate the photoelectric relay 66 which thereby opens contacts 89. Opening of contacts 89 opens the energizing circuit for the time delay relay 91 which restores and closes contacts 93 to again energize the motor 71 to operate the conveyor 18.

Upon the accumulation of articles on the main conveyor section 11 the articles will back up until the light beam of the scanning system 47 is broken to restore photoelectric relay 67 for a sufficient length of time to maintain the contacts 73 closed until the time delay relay 74 operates. Operation of the time delay relay 74 opens contacts 101 to break the energizing circuit for the motor 72 which stops the conveyor 16 to prevent a further accumulation of articles on the conveyor section 11. The interrupting of the light beam of scanning system 37 does not effect the position of the stop plates 31 and 32 as long as the light beam for the scanning system 38 continues to be interrupted. The interruption of the light beam for scanning system 37 restores photoelectric relay 64 to open contacts 86 and 87, however, an energizing circuit for the control relay 88 remains completed through the contacts 92 of the photoelectric relay 63 and contacts 94 of the relay 88.

If there is a sufficient spacing between the articles moving along the conveyor section 12 to permit a completion of the light beam to the photoelectric tube 41 of the scanning system 38, and if no articles are at this time accumulated to break the light beam for scanning system 37, the stop plates 31 and 32 remain in the advanced and retracted positions respectively. Under these conditions contacts 92 of photoelectric relay 63 would be opened but the control relay 88 would remain energized through the closed contacts 86 of the photoelectric relay 64 and the contacts 96 of the relay 88 to retain the solenoids 98 and 99 in their energized condition. If, on the other hand, upon the completion of the light beam of relay 38 with articles accumulated on the main conveyor section 11 such that the light beam of scanning system 37 is broken, photoelectric relay 63 will operate to open contacts 92 and photoelectric relay 64 will restore to open contacts 86 and 87. The opening of contacts 92, 86 and 87 break all energizing paths to the control relay 88 to restore the control relay. Restoration of the control relay 88 opens contacts 94, 96 and 97 and closes contacts 77. Opening of the contacts 97 restores the solenoids 98 and 99 and the closure of contacts 77 again energizes solenoids 78 and 81 to advance the stop plate 32 to a position perpendicular to the conveyor section 12 and to retract the stop plate 31 to a position parallel to the conveyor section 11 thereby preventing the movement of articles on the section 11 and stopping the movement of articles on the section 12.

The scanning system 43 is placed at the junction or point of convergence of the two conveyor sections 11 and 12 to prevent movement of articles along the conveyor section 11 if articles which had been moved along the conveyor section 12 did not successfully complete the transfer from the section 12 to the conveyor 17. The scanning system 43 operates photoelectric relay 62 to open contacts 83 which prevent the energizing of solenoid 81. Solenoid 81 thereby is prevented from retracting stop plate 31 from the perpendicular position blocking the main conveyor section 11. It may be understood that the scanning system 43 is only effective when the stop plate 31 is in the perpendicular position and the stop plate 32 is in the parallel position to allow articles to pass along the conveyor section 12. Under these conditions, if the light beam of scanning system 38 is completed and the light beam of scanning system 37 is interrupted, control relay 88 will be restored, as previously discussed, in order to energize solenoids 78 and 81 to reverse the positions of the stop plates 31 and 32. If an article did not successfully complete the transfer from conveyor section 11 to conveyor section 12, or to the conveyor 17, and remains positioned at the point of convergence of the two conveyor sections, photoelectric relay 62 is restored, contacts 83 are opened and the stop plate 31 is retained in the perpendicular position as the stop plate 32 is moved to the perpendicular position by solenoid 78. If the article positioned at the junction of the conveyor sections is removed to pass beyond scanning system 34, the light beam of this scanning system is again completed to operate photoelectric relay 62, close contacts 83 and energize solenoid 81 to raise the stop plate 31 to the parallel position to permit articles to pass beneath the stop plate.

A circuit is also provided to shut down the entire conveyor system upon a jamming of articles at the point of convergence of the two conveyor sections or somewhere along the conveyor 17. This circuit includes a relay 106 (Fig. 5) which has contacts 107 of photoelectric relay 67, contacts 108 of photoelectric relay 66 and contacts 109 of photoelectric relay 62 in the energizing circuit thereof. Relay 106 will then be operated upon an article being positioned at the junction of the conveyor sections, which restores relay 62 to close contacts 109, combined with a back up of articles on conveyor section 11 which restores photoelectric relay 67 to close contacts 107 and a back up of articles on conveyor section 12 which restores photoelectric relay 66 to close contacts 108. The operation or relay 106 opens contacts 111, 112, 113 and 114 which breaks the energizing circuit for the motors 68, 69, 71 and 72, respectively, to stop the conveyors 16, 18, the conveyor section 12 and the conveyor 17 of which section 11 forms the initial part thereof.

An additional pair of photoelectric scanning systems may be used to increase the capacity of the conveyor 17. This pair of scanning systems would be placed intermediate the pair of scanning systems 37 and 38 and the pair of scanning systems 47 and 48. The additional scanning systems would be connected into the circuit to prevent the change of positions of the stop plates 31 and 32 until there was a back up of articles on the conveyor section associated with the stop plate which is in the advanced or perpendicular position. With the additional scanning systems, the stop plate positions would be changed only after there was a sufficient back up of articles on one conveyor section and a break in the articles in the other conveyor section which would prevent a spacing between the majority of articles delivered to the conveyor 17 and thereby increasing the conveyor capacity.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a conveyor system having a plurality of secondary conveyors converging into a main conveyor, a stop means associated with each secondary conveyor and positioned before the converging point thereof for movement into and out of the path of articles moved on the associated conveyor, a scanning means associated with each secondary conveyor and each operable upon articles moving toward the converging point of the associated conveyor for moving the stop means of the associated conveyor out of the path of articles and moving the other stop means into the path of articles, and means for preventing operation of the other scanning means upon operation of one of the scanning means.

2. In a conveyor system having a main conveyor and a secondary conveyor converging into the main conveyor, a first and second stop means positioned at the main and secondary conveyors respectively before the converging point thereof for movement into and out of the path of articles moved on the conveyors, a first scanning means opearable upon articles moving toward the junction of the conveyors upon the main conveyor moving the first stop means out of the path of the articles and moving the second stop means into the path of the articles, second scanning means operable upon articles moving toward the junction on the secondary conveyor for moving the second stop means out of the path of the articles and moving the first stop means into the path of the articles, means for preventing operation of one of the scanning means upon operation of the other scanning means, and a third scanning means operable upon articles positioned at the junction of the conveyors for preventing movement of the first stop means out of the path of movement of the articles.

3. In a conveyor system having a plurality of secondary conveyors converging into a main conveyor, a stop plate associated with each secondary conveyor and positioned above the conveyors before the junction thereof, means associated with each stop plate for advancing the plate into the path of articles moving on the associated conveyor in a position perpendicular to the conveyor and for retracting the plate out of the path of the articles in a position above and parallel to the conveyor, a scanning means associated with each conveyor for operating the advancing and retracting means associated with the conveyor upon movement of articles on the associated conveyor toward the junction of the conveyors to retract the stop plate of the associated conveyor and advance the other stop plates, and a control means for preventing movement of the other advancing and retracting means by the other scanning means upon operation of one of the advancing and retracting means by the associated scanning means.

4. In a conveyor system having a main conveyor and a secondary conveyor converging into the main conveyor, a first stop plate positioned above the main conveyor before the junction of the conveyors, first means for advancing the first stop plate into the path of articles on the main conveyor in a position perpendicular to the main conveyor and for retracting the first stop means out of the path of the articles in a position above and parallel to the main conveyor, a second stop plate positioned above the secondary conveyor before the junction of the conveyors, second means for advancing the second stop plate into the path of articles on the secondary conveyor in a position perpendicular to the secondary conveyor and for retracting the second stop plate above and parallel to the secondary conveyor, a first scanning means for operating the first and second means to retract the first stop plate and advance the second stop plate upon articles being sensed by the first scanning means on the main conveyor, a second scanning means for operating the first and second means to retract the second stop plate and advance the first stop plate upon articles being sensed by the second scanning means on the secondary conveyor, control means for preventing movement of the stop plates upon articles being sensed by one of the scanning means in the event of continuous sensing of articles by the other scanning means, and third scanning means operable upon articles positioned at the junction of the conveyors for preventing the retraction of the first stop means.

5. In a conveyor system having a plurality of secondary conveyors converging into a main conveyor, a frame positioned over the secondary conveyors before the junction thereof, an arm mounted at one end thereof to the frame and positioned over each secondary conveyor for movement toward and away from the conveyors, a stop plate pivotally mounted on the other end of each arm and positioned perpendicular to the conveyors in the path of articles moving on the conveyors upon movement of the arms towards the conveyors, a rod connected between the frame and each plate for pivoting the plates to a position parallel with the conveyors upon movement of the arms away from the conveyors, a scanning means associated with each secondary conveyor and operable upon articles moving toward the junction on the associated conveyor for moving the arm positioned over the associated conveyor away from the conveyor and moving the other arms toward the other conveyors, and means for preventing operation of the other scanning means upon operation of one of the scanning means.

6. In a conveyor system having a first conveyor and a second conveyor converging into a single third conveyor, a frame positioned over the first and second conveyors, first and second arms mounted at one end thereof to the frame and positioned over the first and second conveyors respectively, a stop plate pivotally mounted on the other end of each of the arms, first control means operable to move the first arm away from the first conveyor and move the second arm toward the second conveyor, second control means operable to move the second arm away from the second conveyor and move the first arm toward the first conveyor, a rod connected between the frame and each plate for positioning the plates perpendicular to the conveyors and in a path of the articles moving thereon when the arms are moved toward the conveyors and pivoting the plates to a position parallel to the conveyors when the arms are moved away from the conveyors, first scanning means for operating the first control means upon articles being moved toward the third conveyor on the first conveyor, second scanning means for operating the second control means upon articles being moved toward the third conveyor on the second conveyor, means for preventing operation of one of the control means by the associated scanning means upon the other scanning means continuously sensing articles, and a third scanning means for preventing the pivotal movement into a parallel position of the plate mounted on the first arm upon articles being positioned at the junction of the first and second conveyors.

7. An accumulator for selectively controlling the advancement of articles from a plurality of secondary conveyors onto a main conveyor, which comprises a conveyor section forming a continuation of each secondary conveyor and converging into the main conveyor, a stop means positioned over each conveyor section before the junction thereof with the main conveyor for movement into and out of the path of articles moved along the conveyor sections, first scanning means associated with each conveyor section and operable upon articles being moved toward the junction of the conveyor sections along the associated conveyor section for moving the stop means associated with the section out of the path of articles and moving the stop means associated with the other conveyor sections into the path of articles, means operated by one of said scanning means for preventing operation of the other scanning means, and a second scanning means associated with each conveyor section and operable upon a back up of articles on the associated section for shutting down the conveyor of which said section forms a continuation.

8. An accumulator for selectively controlling the advancement of articles from a pair of conveyors onto a third conveyor, which comprises a main conveyor section forming the initial portion of the third conveyor and a continuation of a first of said pair of conveyors, a second conveyor section forming a continuation of a second of said pair of conveyors and converging into the main conveyor section, first and second stop means positioned over the main and secondary conveyor sections respectively before the junction thereof for movement into and out of the path of articles moved along the sections, first scanning means operable upon articles being moved toward the junction on the main conveyor section for moving the first stop means out of the path of articles on the main section and moving the second stop means into the path of articles on the secondary section, second scanning means operable upon articles being moved toward the junction on the second conveyor section for moving the second stop means out of the path of articles on the secondary section and moving the first stop means into the path of articles on the main section, means for preventing operation of one of said scanning means upon operation of the other scanning means, a third scanning means operable upon articles positioned at the junction for preventing movement of the first stop means out of the path of movement of the articles, and fourth and fifth scanning means associated with the main and secondary conveyor sections respectively and operable upon a back up of articles on the associated conveyor sections for shutting down the first and second conveyors respectively of said pair of conveyors.

9. An accumulator for selectively controlling the advancement of articles from a pair of conveyors onto a third conveyor, which comprises a main conveyor section forming the initial portion of the third conveyor and a continuation of a first of said pair of conveyors, a secondary conveyor section forming a continuation of a second of said pair of conveyors and converging into the main conveyor section, a frame positioned over said conveyor sections before the junction thereof, an arm mounted at one end thereof to the frame and positioned over each conveyor section for movement toward and away from the sections, a stop plate pivotally mounted on the other end of each arm and positioned perpendicular to the conveyor sections in the path of articles moving on the sections upon movement of the arms toward the sections, a rod connected between the frame and each plate for pivoting the plate to a position parallel with the section upon movement of the arm away from the section, a first pair of scanning means having one means thereof associated with each conveyor section, each of said first scanning means being operable upon articles being moved toward the junction on the associated conveyor section for moving the arm mounted over the associated section away from the section and the other arm toward the section associated therewith, means for preventing operation of one of said pair of scanning means upon operation of the other scanning means of the pair, and a second pair of scanning means having one means thereof associated with each conveyor section and operable upon a back up of articles on the associated section for shutting down the conveyor of said pair of conveyors of which said associated section forms a continuation.

References Cited in the file of this patent

UNITED STATES PATENTS 2,441,469     Cameron _____ May 11, 1948